United States Patent Office 3,012,018
Patented Dec. 5, 1961

3,012,018
FIRE-RESISTANT COPOLYMERS OF ORGANOTIN ACRYLATES AND HALO-ALKYL-SUBSTITUTED VINYL COMPOUNDS
Loreto P. Marinelli, Norwood, Troy M. Andrews, Sudbury, and Juan C. Montermoso, Cochituate, Mass., assignors to the United States of America as represented by the Secretary of the Army
No Drawing. Filed Oct. 28, 1958, Ser. No. 770,237
14 Claims. (Cl. 260—80.5)
(Granted under Title 35, U.S. Code (1952), sec. 266)

The invention described herein, if patented, may be manufactured and used by or for the Government for governmental purposes, without the payment to us of any royalty thereon.

This invention relates to fire-resistant copolymers of organotin acrylates and halo-alkyl-substituted vinyl compounds, and more particularly to copolymers and/or terpolymers of an organotin acrylate (including methacrylate or other substituted acrylate) with one or more halo-alkyl-substituted vinyl compounds capable of imparting fire resistance to the finished copolymer or terpolymer, as for instance bis-(beta chloroethyl-)vinyl phosphonate and/or trifluoroethyl vinyl ether.

This application is a continuation-in-part of our co-pending application Serial Number 749,038, "Organotin Acrylic Polymers," filed July 16, 1958 which discloses the preparation of organotin acrylic polymers having the general formula

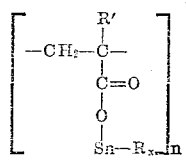

wherein R is a monovalent hydrocarbon radical, R' is hydrogen or a monovalent hydrocarbon radical, and $x$ is from 2 to 3. As stated in the aforementioned application, when $x$ is 3, i.e., when the tin atom of the repeating units carries three organic substituents, the polymer is a chain type polymer having elastomeric properties. On the other hand, when $x$ in the first-mentioned general formula is 2, i.e., when the tin atom in the repeating units carries only two organic substituents, the resulting polymer is generally a non-elastomeric plastic; this is believed to be due to cross-linking, occurring at the unsatisfied valence of the diorgano-substituted tin atom. When $x$ has a value greater than 2 but less than 3, i.e., when the average number of organic substituents carried by the tin atoms in the repeating units are intermediate the values 2 and 3, the properties of the resulting polymer will be either elastomeric or non-elastomeric, depending on the amount of cross-linking; such polymers can be produced by polymerizing a mixture of monomeric diorgano- and triorganotin esters of an acrylic acid. These polymers range from low polymers, including dimers (wherein $n$ is 2) to high polymers, wherein the number of repeating units may be several hundreds or thousands in number.

The present invention is similarly concerned with elastomeric or rubbery materials, but most particularly copolymers and terpolymers of organo-metallic compounds of the type disclosed in our copending application Serial No. 749,038, with fluoro, chloro and/or phosphorus containing vinyl compounds to provide elastomeric and rubbery products having fire-retardant properties.

In accordance with this invention, the group of organotin acrylate type monomers prepared by suitable procedures, when copolymerized with vinyl compounds such as bis-(beta-chloroethyl) vinyl phosphonate or trifluoroethyl vinyl ether or as a terpolymer containing the three aforesaid compounds may be generally designated as condensation copolymers or terpolymers by means of vinyl type polymerization. These form elastomeric or plastic type products that exhibit fire-retardant properties in comparison with the usual hydrocarbon elastomers. More particularly these copolymers and terpolymers may be illustrated by the following formulas to be as follows:

A general formula for a copolymer of an organotin acrylate and bis-(beta-chloroethyl-)vinyl phosphonate is

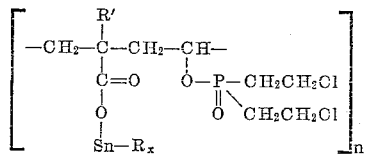

wherein R is an alkyl, aryl, or aralkyl group and R' is hydrogen, an alkyl, aryl, aralkyl, or phenyl group of an unsaturated acrylic or similar unsaturated type acid, $n=2$ to 100,000 or higher, and $x=3$ or 2 or between 2 and 3, the tin acrylate being copolymerized or terpolymerized by suitable procedures to one or more compounds through the vinyl groups of each of the individual monomers.

Thus R may be an organic saturated radical such as butyl, propyl, ethyl, methyl, phenyl, lauryl, etc. Similarly R' may be hydrogen, or an organic saturated radical derivative of an acrylic type acid such as methyl, ethyl, propyl, butyl, phenyl, lauryl, etc. Suitable acids are acrylic, methacrylic, vinyl acetic, allyl acetic, etc. Of these, methacrylic acid and tributyl tin oxide of the aforesaid reactants are preferred for the formation of organotin monomers and their subsequent elastomeric copolymers and terpolymers. Tributyltin methacrylate monomer may be prepared by the procedures of co-pending application Serial No. 749,038 by reacting tributyl tin oxide with methacrylic acid in benzene solution at 50° C. for four to five hours, cooling, and recovering the product as monomeric crystals. Other suitable alkyl or aryl type compounds may be employed for the esterification of the tributyltin compounds for use in the subsequent copolymerization or terpolymerizations. Of these, the alkyl or aryl or similar tin methacrylate derivatives in monomer form may be subsequently copolymerized with a vinyl type compound such as trifluoroethyl vinyl ether according to the formula:

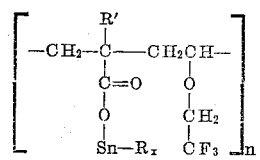

In the case of the terpolymers of the tin acrylate with bis-(beta-chloroethyl) vinyl phosphonate and trifluoroethyl vinyl ether, these compounds may be illustrated as of the structure:

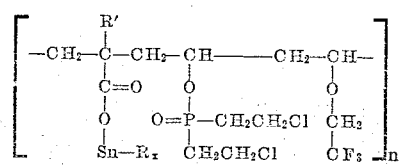

The organotin acrylate-bis (beta-chloroethyl)vinyl phosphonate, organotin acrylate-trifluoroethyl vinyl ether, and tertiary compounds of the aforementioned compounds are polymeric elastomeric materials suitable for use where polymeric or elastomeric products are generally used such as film, foil, coatings, adhesives, impregnants, and elastomeric or polymeric materials in general.

Due to the tin, fluorine, chlorine, and phosphorus present separately or in groups, or all present as in the terpolymers, these elastomeric products also exhibit some degree of fire retardance that gives additional valuable properties to the described elastomers.

These compounds may be prepared in high yield and purity by reacting an organotin acrylate monomer with an unsaturated compound of the type such as bis-(beta-chloroethyl)vinyl phosphonate, or trifluoroethyl vinyl ether or a mixture of the three in combining proportion or in other than combining proportions. It is preferable to use a trialkyl, triaryl, or triaralkyl, e.g., tributyl tin methacrylate in monomer form for copolymerization or terpolymerization. For instance, if it is desired to make a plastic material rather than an elastomer, a dialkyl tin acrylate rather than a trialkyl tin acrylate would be used as a monomer, thereby producing a dialkyl acrylate which on polymerization gives largely a highly cross-linked material when copolymerized with a vinyl compound, rather than a chain type elastomer. Other di-substituted tin acrylates likewise produce plastics rather than elastomers when polymerized or copolymerized. When the alkyltin acrylate monomer is copolymerized by means of polymerizing catalysts such as, for example, benzoyl peroxide or dicumyl peroxide, or an emulsion system using sodium bisulfite and potassium persulfate and the like, a polymeric and elastomeric material is obtained through the unsaturated bonds of the monomeric materials, believed to be most largely long chain polymer elastomeric material.

The type reaction of the aforesaid organotin derivatives using tributyltin methacrylate and bis-(beta-chloroethyl) vinyl phosphonate or trifluoroethyl vinyl ether or a combination of all three is clearly illustrated in the following equations:

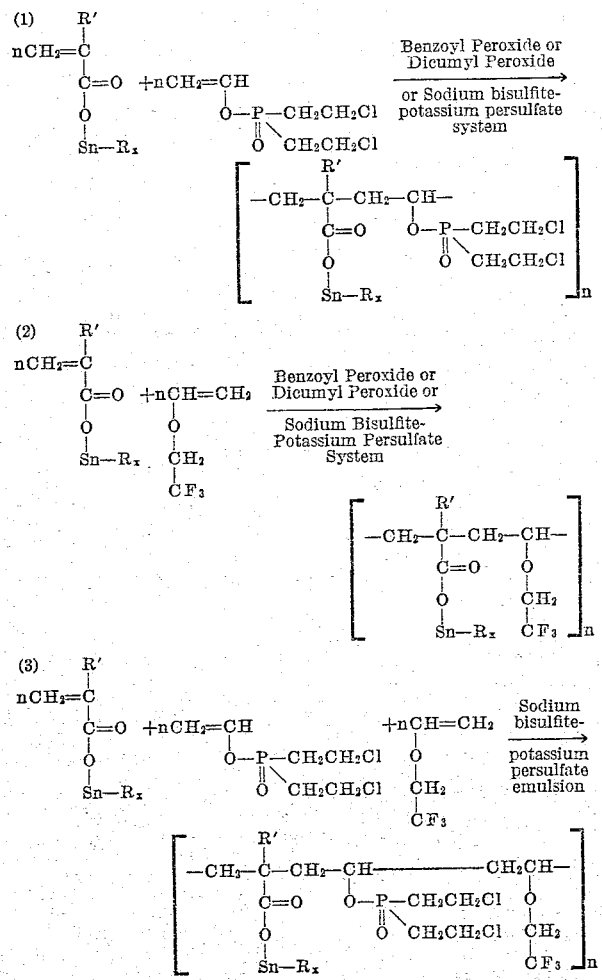

These equations show the reaction of stoichiometric quantities of the three monomers. It is not necessary, however, that stoichiometric proportions be used, since each of the three compounds may react through the vinyl group, partially or entirely, with another, with itself, or with either of the others in varying proportions. In all of these cases, polymerization takes place mainly through the unsaturated carbons or vinyl groups to form what is postulated to be preponderantly a chain type structure. The monomers are converted to high polymer elastomeric material by means of the usual oxidizing or polymerizing catalysts. This may be in solution or bulk systems, but preferably in the emulsion type system. The catalysts used are e.g., benzoyl peroxide or dicumyl peroxide for solution polymerization, or a catalyst such as sodium bisulfite-potassium persulfate or potassium persulfate-lauryl mercaptan for emulsion polymerization to a largely chain type elastomeric product. Although any suitable polymerization temperature may be used, a temperature range of 20°–60° C. is preferable for uniformity of polymer and the highest molecular weight final product. The emulsion system of polymerization is likewise a preferable method for the same reasons. Generally a long period of stirring at low temperature has been employed, particularly by the emulsion system, to provide polymerization. By the emulsion system the dispersing agent is first dissolved in water and the catalyst then added. While stirring, the monomer is added over a period of 10–15 minutes, depending on the batch size and the material. The mixture is then stirred 9–50 hours at a temperature of 20° C.–60° C., the preferred temperature being 50° C. The resulting polymer is precipitated by the usual procedures using an alcohol, e.g., methyl alcohol, or a salt, e.g., sodium chloride. The polymeric material is then well washed with distilled water to remove impurities, such as dispersing agent, catalyst, and any other water soluble material. The elastomeric polymer is then placed in a vacuum air oven at 50° C. for 48 hours to remove water. Any suitable drying equipment may be employed. The resulting slightly yellow product is a stiff rubbery elastomeric material of considerable fire retardant properties. While this material is not absolutely fireproof in the sense that it will not burn at all, it is fire-resistant in the sense that its burning rate is quite low due to the presence of tin, fluorine, chlorine and/or phosphorus, which slows down its combustion rather considerably as compared with straight hydrocarbon polymers.

In lieu of the above-disclosed fire-retardant vinyl compounds, bis-(beta-chloroethyl-)vinyl phosphonate and trifluoroethyl vinyl ether, which are copolymerizable with organotin acrylate monomers, there may be substituted other halogenated homologs and analogs thereof, such as bis-(beta-bromoethyl-) vinyl phosphonate, bis-(beta-fluoroethyl-) vinyl phosphonate, bis-(chloromethyl-)vinyl phosphonate, trifluoromethyl vinyl ether, trichloro-ethyl vinyl ether, tribromo-ethyl vinyl ether, trifluoropropyl vinyl ether, trifluorobutyl vinyl ether, etc. Generally speaking, halogen-substituted vinyl compounds of the general formula $CH_2{:}CH.O.R''$ and $CH_2{:}CH.O.PO.R''_2$ are suitable, wherein $R''$ is a monovalent lower alkyl radical having from 1 to 4 carbon atoms and in which from 1 to 3 of the hydrogen atoms are replaced by halogen atoms. Thus, the fire-resistant copolymers formed in accordance with our invention may be more generally expressed as follows:

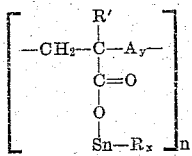

wherein A is a member of the group consisting of
$-CH_2.CH.O.R''$ and $-CH_2.CH.O.PO.R''_2$ wherein y is a number (whole or fraction) from 1 to 2, and wherein all other symbols have the same meanings as aforesaid.

As indicated, the copolymerizable monomers need not be present in stoichiometric proportions, but may be varied over wide limits. In order to obtain the benefit of the fire-retardant effect of the halo-alkyl-substituted vinyl compounds, they should be present in a proportion of at least about 2 parts by weight per 100 parts of the aggregate weight of the monomers. At least about 30 parts, and preferably about 50 or more parts by weight per 100 parts of the monomers, should be an organotin acrylate (or homolog thereof), in order that the copolymer may have the desired properties characteristics of an organo-tin polymer. Thus, generally speaking, the proportion of monomers may vary between about 30 and about 98 parts by weight of organo-tin acrylate (or methacrylate), and about 2 to about 70 parts by weight of halo-alkyl-substituted vinyl compound or compounds copolymerizable therewith.

We now proceed to illustrate the practice of our invention by means of several examples, without, however, limiting ourselves to any specific details or conditions set forth therein:

COPOLYMERS OF TRIBUTYL TIN METHACRYLATE AND BIS-(BETA-CHLOROETHYL-)VINYL PHOSPHONATE

*Example I*

The tributyl tin methacrylate monomer used in these and subsequent examples is prepared in accordance with Example III of our co-pending application Serial No. 749,038, by reacting tributyl tin oxide (.175 mol) with methacrylic acid (.35 mol) in benzene solution at 50° C. for four or five hours, cooling, and recovering the product as monomeric tributyltin methacrylate monomer crystals. The material is subjected to emulsion copolymerization with bis-(beta-chloroethyl)vinyl phosphonate according to the following proportions:

| | Grams |
|---|---|
| Tributyl tin methacrylate monomer | 98.0 |
| Bis-(beta-chloroethyl-)vinyl phosphonate | 2.0 |
| Distilled water | 300.0 |
| Emulsifying agent [1] | 10.0 |
| Lauryl mercaptan | 00.5 |
| Potassium persulfate | 0.3 |

[1] A suitable emulsifier is Triton X-100, a commercially available polyethylene glycol alkyl aryl ether.

The Triton X-100 is first dissolved with rapid stirring in the distilled water and heated to 50° C. The lauryl mercaptan and potassium persulfate are then added. The reactants are then added slowly with stirring and the reaction of polymerization allowed to proceed at 50° C. with continued stirring for 16 hours. The resulting polymer is then coagulated with methyl alcohol and the liquid is poured off. The residual polymeric material is well washed with water to remove all water soluble material (e.g., emulsifying agent, catalyst, etc.). The polymer is then placed in a vacuum air oven at 70° C. for 48 hours to remove water. The resulting slightly yellow product is medium firm, tough, fire-resistant, elastomeric material.

*Example II*

Example I is repeated but the proportions are changed as follows:

| | Grams |
|---|---|
| Tributyl tin methacrylate monomer | 60.0 |
| Bis-(beta-chloroethyl-)vinyl phosphonate | 40.0 |
| Distilled water | 300.0 |
| Triton X-100 | 12.0 |
| Sodium bisulfite | 0.3 |
| Potassium persulfate | 0.3 |

After 20 hours, there is obtained a slightly yellow, hard plastic, fire-resistant material, having the general formula:

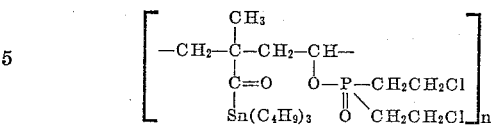

COPOLYMERS OF TRIBUTYL TIN METHACRYLATE AND TRIFLUORO VINYL ETHER

*Example III*

The following monomers are used:

| | Grams |
|---|---|
| Tributyl tin methacrylate monomer | 70.0 |
| Trifluoroethyl vinyl ether | 30.0 |
| Distilled water | 250.0 |
| Triton X-100 | 12.0 |
| Sodium bisulfite | 0.3 |
| Potassium persulfate | 0.3 |

The Triton X-100 is first dissolved in the distilled water with stirring and heated to 30° C. The reactants are then added slowly with stirring. The bisulfite and persulfate are then added. The polymerization reaction is allowed to proceed at 30° C. with continued stirring for 20 hours. The resulting polymer is then coagulated with methyl alcohol and the liquid poured off. The residual polymeric material is well washed to remove all water-soluble material and then placed in a vacuum air oven at 70° C. for 48 hours to remove water. The resulting gray polymer is a firm, tough, elastomeric, fire-resistant material, having the general formula:

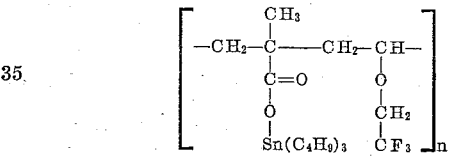

*Example IV*

Example III is repeated, except that 50 grams of tributyl tin methacrylate and 50 grams of trifluoroethyl vinyl ether are used. The resulting gray product is a firm, tough, elastomeric, fire-resistant material.

*Example V*

Example III is repeated, except that 30 grams of tributyl tin methacrylate and 70 grams of trifluoroethyl vinyl ether are used. The resulting gray product is a hard, tough, fire-resistant, elastomeric material.

TERPOLYMERS OF TRIBUTYL TIN METHACRYLATE, BIS - (BETA - CHLOROETHYL-) VINYL PHOSPHONATE AND TRIFLUORO ETHYL VINYL ETHER

*Example VI*

The following emulsion system is used in making a terpolymer:

| | Grams |
|---|---|
| Tributyl tin methacrylate monomer | 50.0 |
| Bis(beta-chloroethyl-)vinyl phosphonate | 30.0 |
| Trifluoroethyl vinyl ether | 20.0 |
| Distilled water | 250.0 |
| Triton X-100 | 12.0 |
| Sodium bisulfite | 0.3 |
| Potassium persulfate | 0.3 |

The Triton X-100 is first dissolved in the distilled water with rapid stirring and then heated to 50° C. The reactants are then added slowly with stirring. The bisulfite and persulfate are then added to the flask. The polymerization reaction is allowed to proceed at 50° C. in a closed system with continual stirring for 20 hours. The resulting polymer is then coagulated with methyl alcohol and the liquid poured off. The residual polymeric material is well washed to remove all water soluble material and then placed in a vacuum air oven at 70° C. for 48 hours to remove water. The resulting slightly colored product is a firm, tough, elastomeric, fire-resistant material, having the general formula:

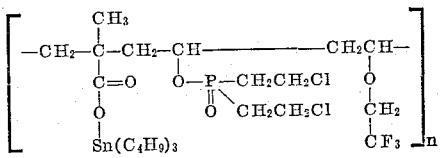

This reaction is carried out under a closed system with a condenser since the trifluoroethyl vinyl ether boils at 42° C.

*Example VII*

Example VI is repeated, except that 25 grams of bis-(beta-chloro-ethyl-)vinyl phosphonate and 25 grams trifluoroethyl vinyl ether are used. The resulting product is a tough, elastomeric, fire-resistant material.

While the foregoing examples set forth various fire-resistant copolymers and terpolymers of tributyl tin methacrylate, it will be understood, of course, that other alkyl tin acrylates, methacrylates and homologs thereof, including those disclosed in our copending application Serial No. 749,038, may be likewise copolymerized or terpolymerized in the manner indicated above so as to yield fire-resistant polymeric products.

While the invention has thus been described with reference to various examples, procedures and products, it will be apparent to those skilled in the art that various modifications may be made, equivalents substituted therefor, or varied similar procedural methods employed to attain the objectives of the invention without departing from the true nature of the present invention.

We thus desire to claim our invention broadly, and to this end append hereto the following claims, which should be interpreted as broadly as the prior art and the spirit of our invention, as generally described in the foregoing specification.

We claim:

1. A fire-resistant copolymer of from about 30 to about 98 parts by weight of a member of the group consisting of trialkyl tin acrylate having at least four carbon atoms per alkyl group and trialkyl tin methacrylate having at least four carbon atoms per alkyl group, and from about 70 to about 2 parts by weight of at least one member of the group consisting of bis-(halo-alkyl-)vinyl phosphonate having from one to four carbon atoms per alkyl group and a trihaloalkyl vinyl ether having from one to four carbon atoms in the alkyl group.

2. A fire-resistant copolymer of from about 30 to about 98 parts by weight of a trialkyl tin acrylate having at least four carbon atoms per alkyl group and from about 70 to about 2 parts by weight of a bis-(haloalkyl-)vinyl phosphonate having from one to four carbon atoms per alkyl group.

3. A fire-resistant copolymer of from about 30 to about 98 parts by weight of a trialkyl tin acrylate having at least four carbon atoms per alkyl group and from about 70 to about 2 parts by weight of a trihaloalkyl vinyl ether having from one to four carbon atoms in the alkyl group.

4. A fire-resistant terpolymer of from about 30 to about 98 parts by weight of a trialkyl tin acrylate having at least four carbon atoms per alkyl group, and from about 70 to about 2 parts by weight of a mixture of a bis-(haloalkyl-)vinyl phosphonate having from one to four carbon atoms per alkyl group and a trihalo-alkyl vinyl ether having from one to four carbon atoms in the alkyl group.

5. A fire-resistant copolymer of from about 30 to about 98 parts by weight of a trialkyl tin methacrylate having at least four carbon atoms per alkyl group and from about 70 to about 2 parts by weight of a bis-(haloalkyl-)vinyl phosphonate having from one to four carbon atoms per alkyl group.

6. A fire-resistant copolymer of from about 30 to about 98 parts by weight of a trialkyl tin methacrylate having at least four carbon atoms per alkyl group and from about 70 to about 2 parts by weight of a trihaloalkyl vinyl ether having from one to four carbon atoms in the alkyl group.

7. A fire-resistant terpolymer of from about 30 to about 98 parts by weight of a trialkyl tin methacrylate having at least four carbon atoms per alkyl group, and from about 70 to about 2 parts by weight of a mixture of a bis-(haloalkyl-)vinyl phosphonate having from one to four carbon atoms per alkyl group and a trihaloalkyl vinyl ether having from one to four carbon atoms in the alkyl group.

8. Process of preparing a fire-resistant copolymer, comprising copolymerizing from about 30 to about 98 parts by weight of a member of the group consisting of trialkyl tin acrylate having at least four carbon atoms per alkyl group and trialkyl tin methacrylate having at least four carbon atoms per alkyl group, and from about 70 to about 2 parts by weight of at least one member of the group consisting of bis-(halo-alkyl-)vinyl phosphonate having from one to four carbon atoms per alkyl group and a trihalo-alkyl vinyl ether having from one to four carbon atoms in the alkyl group.

9. A fire-resistant copolymer of from about 30 to about 98 parts by weight of tributyl tin methacrylate and bis-(beta-chloroethyl-)vinyl phosphonate.

10. A fire-resistant copolymer of from about 30 to about 98 parts by weight of tributyl tin methacrylate and from about 70 to about 2 parts by weight of trifluoroethyl vinyl ether.

11. A fire-resistant terpolymer of from about 30 to about 98 parts by weight of tributyl tin methacrylate, and from about 70 to about 2 parts by weight of a mixture of bis-(beta-chloroethyl-)vinyl phosphonate and trifluoroethyl vinyl ether.

12. Process of preparing a fire-resistant copolymer, comprising copolymerizing from about 30 to about 98 parts by weight of tributyl tin methacrylate and from about 70 to about 2 parts by weight of bis-(beta-chloroethyl-) vinyl phosphonate in the presence of a polymerization catalyst.

13. Process of preparing a fire-resistant copolymer, comprising copolymerizing from about 30 to about 98 parts by weight of tributyl tin methacrylate and from about 70 to about 2 parts by weight of trifluoroethyl vinyl ether in the presence of a polymerization catalyst.

14. Process of preparing a fire-resistant terpolymer, comprising copolymerizing, in the presence of a polymerization catalyst, from about 30 to about 98 parts by weight of tributyl tin methacrylate, and from about 70 to about 2 parts by weight of a mixture of bis-(beta-chloroethyl-)vinyl phosphonate and trifluoroethyl vinyl ether.

References Cited in the file of this patent

UNITED STATES PATENTS 2,253,128    Langkammerer _____ Aug. 19, 1941

UNITED STATES PATENT OFFICE
CERTIFICATE OF CORRECTION

Patent No. 3,012,018                    December 5, 1961

Loreto P. Marinelli et al.

It is hereby certified that error appears in the above numbered patent requiring correction and that the said Letters Patent should read as corrected below.

Column 4, line 38, for "over" read -- oven --; column 5, line 14, after "properties" insert -- and --; column 7, line 39, after "as", second occurrence, insert -- permitted by --; column 8, line 35, after "and" insert -- from about 70 to about 2 parts by weight of --.

Signed and sealed this 17th day of April 1962.

(SEAL)
Attest:

ESTON G. JOHNSON

Attesting Officer

DAVID L. LADD

Commissioner of Patents